June 4, 1968 E. D. HILL 3,387,074
INK TRANSFER MEMBER
Filed Dec. 16, 1963
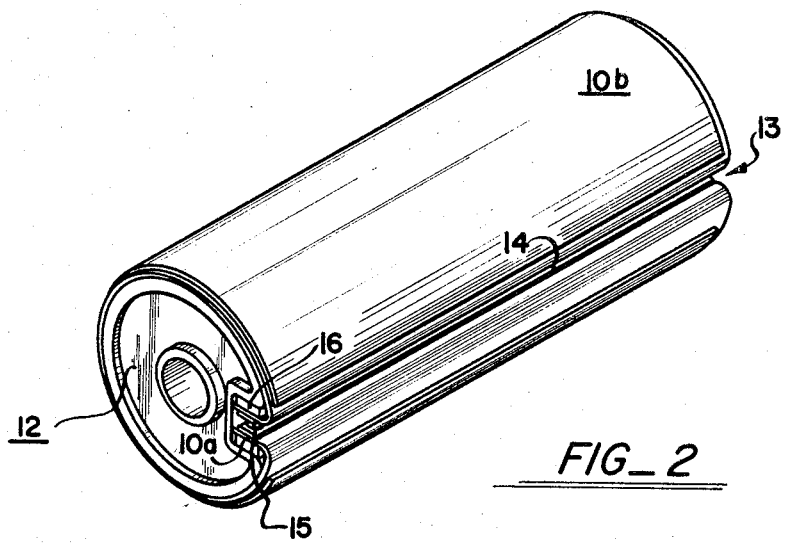
FIG_2
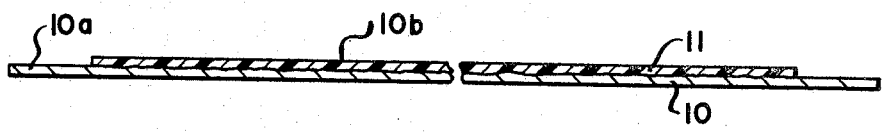
FIG_1
INVENTOR.
EDWARD D. HILL

United States Patent Office 3,387,074
Patented June 4, 1968

3,387,074
INK TRANSFER MEMBER
Edward D. Hill, 3140 W. 32nd St.,
Cleveland, Ohio 44109
Filed Dec. 16, 1963, Ser. No. 330,675
5 Claims. (Cl. 264—259)

ABSTRACT OF THE DISCLOSURE

The method of making an ink transfer member comprising a metallic sheet having a layer of a soft, resilient, ink-attractive, ink-resistant, non-foamed elastomeric polyurethane overlying and adhered to the sheet, the polyurethane layer having an as-formed, underground and unmachined exposed surface made by reacting the polyurethane in a horizontal mold against a superposed backing member.

---

It is customary in graphic arts to wrap a roller or cylinder with a removable layer of an ink-attractive material, such as a printer's blanket, an offset blanket, ink-distributing roller, etc., rather than to deposit or adhere such material directly to a roller. When the ink-attractive layer is damaged, worn or otherwise in need of removal, it is accordingly a much simpler task to remove and replace it rather than to remove and replace the roller itself.

However, it has been quite difficult to provide a blanket or the like which possesses acceptable ink-attractive properties and at the same time is relatively dimensionally stable. In the offset printing process, for instance, an offset blanket having an impression face is drawn about a cylinder with the ends of the blanket suitably secured to the cylinder as by clamps which secure the ends of the blanket within an axially disposed gap of the cylindrical surface. Cylindrically printing plates are mounted on a roller so as to have rolling engagement with the face of the blanket in order to transfer to it an ink impression. Material to be printed is then passed in sheet form into contact with the inked blanket and thereby lifts the ink from the blanket. The printing process is continuous, so that the printing plates contact intermittently the deposited ink impression on the offset blanket. Any shifting of the blanket which easily occurs as by stretching of the blanket results in a smudged impression. It is then necessary to stop the press, clean the blanket, and usually to readjust its position as by further stretching.

In order to impart some dimensional stability to ink-carrying blankets and the like, it has been proposed to use stronger and harder resins from which to form such blankets, for example, synthetic resins having Shore A hardness of about 75 to 90. However, such resins are not tacky and have a smooth, shiny surface such that the ink-transfer or ink-carrying qualities are seriously adversely affected. On the other hand, if softer, more resilient resins are used, the blanket or the like is subject to the undesired stretching and distortion mentioned.

A still further prior practice in the preparation of an inking or transfer roller is to machine or grind the roller, as by an abrasive wheel, to "true" the exposed or impression face. As an instance, a printing roller may be cast in a mold about a roller core as taught by United States Patent 2,536,233 to Spencer. Thereafter, it is the practice to grind the cast roller to a desired diametral size.

I have now developed an improved ink transfer member which obviates the foregoing objections as well as the need for a grinding or truing operation. In the present invention, in one form, a metallic backing member carries a relatively soft, ink-attractive layer of polyurethane and is so constructed preferentially to absorb any force tending to stretch or otherwise deform the layer. Further, the polyurethane layer need not be, and preferably is not, subject to any additional processing step such as grinding.

It is therefore a principal object of the invention to provide an improved ink transfer member.

Another object is to provide a printing blanket and the like having an impression face of acceptable ink-attractive properties and yet which is not subject to stretching or other like deformation.

A further object is to provide a printer's blanket and the like having no need for a final shaping or grinding operation.

A still further object is to provide a printer's blanket and the like having an impression face composed of a soft, relatively resilient polyurethane.

Other objects will be apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

In the accompanying drawing:

FIGURE 1 is a longitudinal section of one form of the present invention; and

FIGURE 2 is a perspective view of a cylindrical press platen having a blanket of the present invention.

The present ink transfer member comprises a metallic backing member and a layer of a soft, resilient, ink-attractive but chemically ink-resistant polyurethane. Polyurethane has been found to have properties which uniquely adapt it for the purposes indicated. The polyurethane layer may be separately adhered to the metallic backing member or coated and set directly thereon, as hereinafter described. Preferably, however, the polyurethane layer when set is not ground or otherwise further treated.

As used here and in the claims, the term "ink transfer member" is taken to include a printer's blanket, an offset blanket as for a wrap-around or web-fed press, a transfer roller for carrying or distributing ink as from an inking roller to raised type or to a dry offset plate or to a lithographic planographic plate, and the like.

The metallic backing member is designed to absorb stresses and strains rather than the layer of soft polyurethane which overlies and is adhered thereto. By the same token, it is thus possbile to use a relatively soft, resilient polyurethane which otherwise would be almost continuously elongated through stretching. The type of metal used for the backing support is not at all critical and may comprise aluminum, zinc, magnesium, copper, brass, steel, and alloys of two or more metals. Ordinarily, aluminum is preferred. The backing member is normally in the form of a sheet or strip and as flexible as may be necessary to meet demands of installation, for example, of sufficient flexibility to be wrapped around a supporting cylinder or roller. In general, a metal sheet may be in the range of 0.003 inch to 0.050 inch in thickness.

As indicated, the ink-attractive layer deposited onto the metallic backing member is polyurethane, including cross-linked polyurethanes. Any suitable formulation may be used to produce the polyurethane rubber. For example, suitable formulations and starting materials for polyurethane are disclosed in U.S. Patents 2,620,516, 2,621,166, 2,729,618, 2,764,565, and 2,778,810, such patents hereby being incorporated by reference.

Generally a polyurethane is prepared by reacting an organic compound having reactive hydrogen atoms, such as for example a polyester, a polyalkylene-ether glycol, a polyesteramide, a polyalkylene-thioether glycol, and the like with an organic polyisocyanate. Various compounds which may serve as the defined organic compound and polyisocyanate are disclosed in the cited patents. Suitable activators, such as those also disclosed in the mentioned patents, may be used in forming the polyurethane. The activator and polyisocyanate may be injected into a confined stream of the organic compound having the reactive hydrogen atoms in accordance with the process of U.S. Patent No. 2,764,565. The resulting mixture is then poured into the mold until chemical reaction and curing has taken place. Curing may be accelerated by heating the closed mold to temperatures of 100° C. or more.

One method of preparing a cross-linked polyurethane comprises reacting the organic compound having active hydrogen atoms, such as the polyester, with an excess of the organic polyisocyanate needed to react with such organic compound and form an isocyanate-terminated linear polymer. A cross-linker, sometimes also referred to as a chain-extender, is then reacted with the terminal isocyanate groups of such linear polymers to link linearly two or more of such polymers together to produce a still longer linear polymer. Such a cross-linker may include polyalcohols, such as butane diol, ethylene glycol, propylene glycol, butylene glycol, glycerol. Also the cross-linker may comprise trimethylol propane, hydroquinone, and 1,4 di-(hydroxyethyl) benzene, various amines (especially diprimary amines) and still other compounds known in the art having active hydrogen atoms.

The chain extended linear polymer contains within the polymeric chain reactive hydrogen atoms which furnish reaction sites for the cross-linking reaction. When the active hydrogen atom is on a urethane group the reaction is by allophonation. When the active hydrogen atom is on a urea group a biuret is formed. To produce a cross-link at the sites indicated, a polyisocyanate-terminated compound is thought to react one of its isocyanate groups with an active hydrogen atom of one linear polymer and another of its isocyanate groups with a reactive hydrogen atom of another linear polymer.

In general, relatively soft, resilient elastomeric polyurethanes may comprise the described ink-attractive layer. More particularly, I have found that a polyurethane having the following properties is best suited for the indicated application: a Shore A hardness within the range of about 10 to about 50 and preferably within the range of about 17 to about 30; a resiliency at room temperature within the range of about 30 percent to about 55 percent; a compression set (20% compression for 24 hours at room temperature) within the range of about 1.5 percent to 9 percent; and an elongation within the range of about 135 percent to about 400 percent. The term "room temperature" is taken to mean approximately 65° F. to 75° F.

One important feature of the present invention is to use the polyurethane as cast and set, that is, without grinding or "truing" its surface. The unground surface of the polyurethane has a material tackiness which very appreciably aids the acceptance and transfer of ink. If the surface of a polyurethane is abraided as by grinding in order to bring its thickness or size within dimensional tolerances, this inherent tackiness is destroyed. Moreover, I have found that casting a layer of polyurethane as hereinafter described actually leaves the resulting impression face smoother than a ground surface. The latter often reveals under magnification "hills and valleys" which are not true of the present polyurethane layer.

To prepare the present ink transfer member, I cast a flowable polyurethane melt in a suitably flat horizontal plane (when the effect of gravity is employed) and allow the melt to seek its own level. For example, a suitable shallow tray with vertical sides may be used to receive the melt. The height of thickness of the cast layer is readily controlled by the amount of melt so cast and is substantially uniform throughout. Thereafter the polyurethane is allowed to set. Normally, the polyurethane is heated to accomplish the setting, for instance, over a steam table (212° F. to about 300° F.) for about 0.5 hour to several hours.

The above method can be carried out over a suitable support such as a glass surfaced plate or tray. The set polyurethane layer may then be stripped away and transferred to the metal support intended to serve as the backing member of the ink transfer product. In this technique, the polyurethane layer is adhered to the metal support by the use of suitable known adhesives. For example, rubber cement, epoxy resins, polyacrylate resins, additional polyurethane unset melt, etc., can be used to effect this adhesion.

Another technique comprises casting the polyurethane melt directly on the metal sheet or strip which is to define the backing support and then setting the polyurethane. In this case I have not found an adhesive to be necessary since the polyurethane adheres upon setting. Also, in this case, the end margins of the sheet are preferably left free of the polyurethane melt to afford means by which to grip the ink transfer member and thereby provide dimensional stability in both a longitudinal and transverse direction of the metal strip.

A preferred technique is to cast the polyurethane melt into a tray such as first described, and one which has been carefully leveled, and to fill the tray overflowing with the melt. When the melt has "settled," as may be evidenced for example by a reflecting, mirror-like surface, a metal sheet is laid over the edges of the tray and in contact with the cast polyurethane melt. Thereafter, the melt and assembly is heated to set the melt as before.

The bottom of the tray has a surface, such as glass, to which the polyurethane does not adhere as well as to the metal sheet. Consequently the metal sheet and adhered polyurethane layer are stripped away from the shallow tray and then trimmed peripherally to the desired size, preferably leaving end parts of the metal sheet as illustrated in the drawing at 10a. This teaching is preferred because the impression face is that which originally contacted the bottom of the tray. As a result, the impression face is especially smooth and has been protected prior to set at all times such as from atmospheric dust.

Regardless of how the polyurethane layer is prepared, the polyurethane itself has been found to have many desirable properties for use as an ink transfer medium. The natural tack described (unground) enables the polyurethane to carry considerably more ink and for a longer period of time. The tackiness of the unground polyurethane is such that it preferentially removes lint and the like directly from raised type. The polyurethane has excellent scuff and abrasion resistance. The polyurethane layer has a smooth surface and yet may be subject to repeated blows without permanent damage, that is, a polyurethane of the properties indicated has fast recovery from deformation. Further, the polyurethane does not mar after being struck inspite of its relative softness. By the term "ink-resistant" polyurethane is meant a polyurethane which withstands use in the environment indicated for an appreciable length of time before degradation makes further use inadvisable. Some inks, usually those containing ketones or trichloroethylene have been found to have a gradual swelling effect on polyurethanes, but even where such inks are used the effect is relatively slow and does not destroy the useful life of the polyurethane layer until a substantial period of use has passed. The quoted term includes polyurethanes useable with such inks. Polyurethanes have a high resistance to the more commonly used ink media and cleaning fluids.

In order to impart some degree of dimensional stability to resinous blankets, it has been proposed to use glass fibrous materials such as mats to reinforce the blankets and thereby reduce the tendency to stretch. However, the use of glass fibrous materials with a cast polyurethane has several problems. For one, a glass cloth tends to float when coated with a polyurethane reaction mixture. Moreover, the presence of moisture on the large surface area of glass fibers is even a more serious problem. Such moisture readily reacts with the isocyanato radical of the organic polyisocyanate in the reaction mixture to generate carbon dioxide gas. Indeed, this is one technique employed to produce foamed polyurethane. The resulting bubbling even to a small extent results in pinholes which render the final product unacceptable.

EXAMPLE

A polyester was prepared from one mol of adipic acid and 1.1 mol of ethylene glycol by thermal condensation at a temperature of about 200° C. to about 220° C., the polyester having a hydroxyl number of 50 and an acid number of about one. To the polyester was added the sodium salt of diisobutylnaphthalene sulfonic acid in an amount of 0.01 percent. To 1,000 grams of the polyester thus prepared were mixed 180 grams of naphthalene-1,5-diisocyanate. The reaction mixture was stirred at a temperature of about 125° C. for about 15 minutes. To this reaction mixture 20 grams of 1,4-butylene glycol were added. After thoroughly mixing, the resulting liquid was cast onto an aluminum sheet measuring about 0.030 inch in thickness. The sides and ends of the aluminum sheet 10 (FIGURE 1) were dammed to prevent overflow of the polyurethane melt and to leave ends 10a of the sheet free of the polyurethane melt. A volumetric amount of the melt was cast to form a layer about one-fourth to three-eighths inch in thickness. The sheet 10 and melt were held at a temperature of 120° C. for about an hour to yield a set polyurethane layer 11.

In use, the blanket of FIGURE 1 was mounted on a cylinder 12 as shown in FIGURE 2. The cylinder has an axially-disposed gap 13 into which the ends 10a of the blanket of FIGURE 1 are turned and secured by metal clamp bars 14 and bolts 15 passing through the bars and the blankets to tension bars 16. The latter are adapted to be drawn into the gap by screws in a manner known in the art in order to tension a blanket. It will be noted that in this case the tension is exerted strictly on the metal sheet 10 and none of the force is transferred to the layer 11. The cylinder 12 thus presents the untensioned printing or impression face 10b as its outward peripheral surface.

What is claimed is:
1. A method of preparing an ink transfer member comprising the steps of:
  (a) placing an open tray-like mold in a substantially horizontal plane,
  (b) filling the mold substantially to overflowing with a liquid polyurethane reaction mixture to form a horizontally-disposed layer of substantially uniform thickness in said mold,
  (c) contacting a sheet backing member against said polyurethane reaction mixture while in said mold,
  (d) reacting the reaction mixture to form a non-foamed, solidified, polyurethane elastomer adhered to said backing member,
  (e) then removing the sheet backing member and adhered polyurethane elastomer from the mold to form the ink transfer member,
  (f) the exposed surface of said solidified polyurethane layer being uniformly smooth and tacky and adapted for use in an as-cast, unground condition, and said solidified elastomer being a soft, resilient, ink-attractive and ink-resistant polyurethane.

2. The method of claim 1 wherein said sheet backing member is metallic.

3. The method of claim 1 wherein said sheet backing member has free marginal edges adapted to accept, in lieu of the solidified polyurethane elastomer, stretching forces applied during use of the ink transfer member.

4. The method of claim 1 wherein during step (b) the polyurethane reaction mixture seeks its own level substantially solely by gravity to form a layer thereof disposed in a substantially flat horizontal plane.

5. The method of claim 1 wherein the solidified polyurethane of part (f) has at room temperature a Shore A hardness of about 10 to about 50, a resiliency of about 30 percent to about 55 percent, a compression set of about 1.5 percent to about 9 percent, and an elongation of about 135 percent to about 400 percent.

References Cited

UNITED STATES PATENTS

| | | | |
|---|---|---|---|
| 3,057,018 | 10/1962 | Lawrence et al. | 156—242 |
| 1,897,148 | 2/1933 | Rowell | 161—401 |
| 2,805,182 | 9/1957 | Hallenbeck | 161—190 |
| 2,992,939 | 7/1961 | Larson et al. | 161—190 X |
| 2,850,424 | 9/1958 | Finelli | 161—190 X |
| 3,235,772 | 2/1966 | Gurin | 161—401 X |
| 3,276,947 | 10/1966 | Waterman | 161—401 X |

OTHER REFERENCES

Dumbrow, B. A.: "Polyurethanes," Reinhold Pub. Corp., New York, 1957, pp. 107—112.

EARL M. BERGERT, *Primary Examiner.*

CLIFTON B. COSBY, *Examiner.*